(12) United States Patent
Ho

(10) Patent No.: US 8,196,597 B2
(45) Date of Patent: Jun. 12, 2012

(54) CHECK VALVE

(75) Inventor: Thanh Ho, Brunswick, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 905 days.

(21) Appl. No.: 11/767,159

(22) Filed: Jun. 22, 2007

(65) Prior Publication Data
US 2008/0314449 A1 Dec. 25, 2008

(51) Int. Cl.
F17D 3/01 (2006.01)
(52) U.S. Cl. .................. 137/12; 137/513.5; 137/512.3
(58) Field of Classification Search ............... 137/512.3, 137/519.5, 513.5, 12
See application file for complete search history.

(56) References Cited

U.S. PATENT DOCUMENTS

| | | | |
|---|---|---|---|
| 2,731,299 A * | 1/1956 | Bramming | 239/590.5 |
| 4,562,852 A | 1/1986 | Britt | |
| 4,706,705 A | 11/1987 | Lee, II | |
| 4,953,588 A | 9/1990 | Sands | |
| 5,236,250 A | 8/1993 | Moody et al. | |
| 5,409,303 A | 4/1995 | Engelbert et al. | |
| 5,449,225 A | 9/1995 | Burgdorf et al. | |
| 6,116,280 A | 9/2000 | Goodell | |
| 6,769,744 B2 | 8/2004 | Marsh et al. | |
| 6,786,232 B2 | 9/2004 | Schuller et al. | |
| 7,077,481 B2 | 7/2006 | Marsh et al. | |
| 2002/0078998 A1 | 6/2002 | Szabo et al. | |
| 2005/0279411 A1 | 12/2005 | Wang | |

FOREIGN PATENT DOCUMENTS

| | | | |
|---|---|---|---|
| GB | 2319587 A | | 5/1998 |
| GB | 2370097 | * | 6/2002 |

* cited by examiner

Primary Examiner — Kevin Lee
Assistant Examiner — Macade Brown
(74) Attorney, Agent, or Firm — Eugene E. Clair; Cheryl L. Greenly

(57) ABSTRACT

In one aspect of the present invention, it is contemplated that a valve includes a passage. A first sealing element is biased to restrict flow of a fluid in a first direction through the passage when an upstream volumetric flow rate of the fluid in the first direction is less than a first predetermined threshold. A second sealing element is biased to unrestrict flow of the fluid to a baseline unrestricted flow rate in a second direction through the passage when an upstream volumetric flow rate of the fluid in the second direction is less than a second predetermined threshold.

22 Claims, 4 Drawing Sheets

CHECK VALVE

BACKGROUND

The present invention relates to a check valve. It finds particular application in conjunction with valves used in heavy vehicles and will be described with particular reference thereto. It will be appreciated, however, that the invention is also amenable to other applications.

Traditional check valves normally permit a fluid to flow through the valve in one direction. A threshold volumetric flow rate is the minimum upstream volumetric flow rate at which the valve operates to pass fluid-no fluid flows through the valve when the upstream volumetric flow rate is below the threshold volumetric flow rate. It is desirable to provide a check valve including dual threshold volumetric flow rates.

The present invention provides a new and improved apparatus and method for a dual threshold check valve.

SUMMARY

In one aspect of the present invention, it is contemplated that a valve includes a passage. A first sealing element is biased to restrict flow of a fluid in a first direction through the passage when an upstream volumetric flow rate of the fluid in the first direction is less than a first predetermined threshold. A second sealing element is biased to unrestrict flow of the fluid to a baseline unrestricted flow rate in a second direction through the passage when an upstream volumetric flow rate of the fluid in the second direction is less than a second predetermined threshold.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENTS

Figure 1:
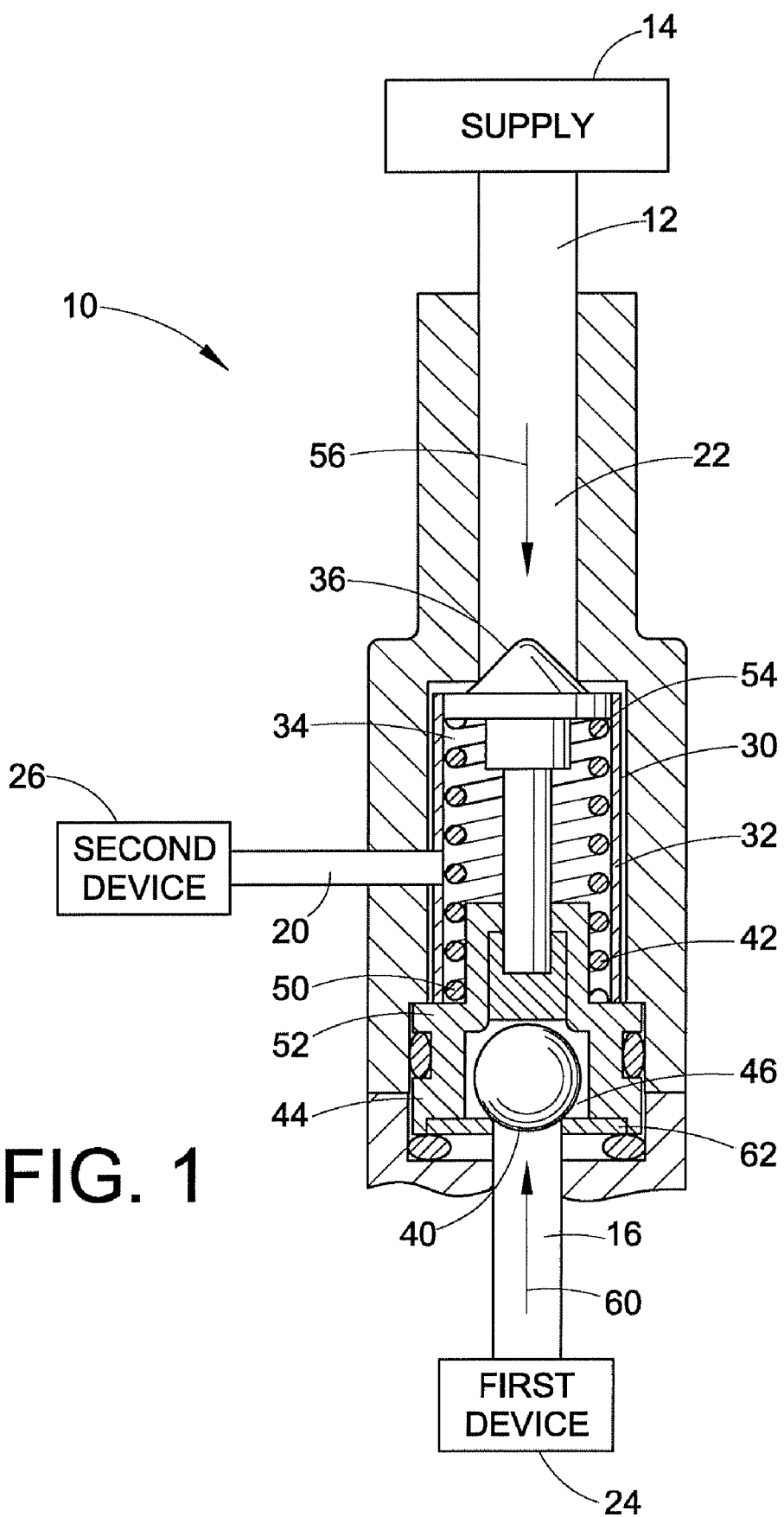
FIG. 1 illustrates a valve in accordance with one embodiment of an apparatus illustrating principles of the present invention.

With reference to FIG. 1, an exemplary valve 10 is illustrated in accordance with one embodiment of the present invention. The valve 10 includes a supply port 12, which receives compressed fluid from a supply 14, a first delivery port 16, and a second delivery port 20. A valve passage 22 ("the first passage") fluidly communicates with the supply port 12, the first delivery port 16 which fluidly supplies the compressed fluid to a first device 24, and the second delivery port 20 which fluidly supplies the compressed fluid to a second device 26. A fluid control valve 30 is positioned in the first passage 22.

The fluid control valve 30 (e.g., a check valve) includes a housing 32, a fluid control valve passage 34 ("the second passage") defined in the housing 32, a first sealing element 36, a second sealing element 40, and a biasing member 42 (e.g., a spring). A sealing element housing 44 is secured within the housing 32 and defines a volume 46 in which the second sealing element 40 is positioned. In the illustrated embodiment, a first end 50 of the biasing member 42 abuts a shoulder 52 of the sealing element housing 44. A second end 54 of the biasing member 42 biases the first sealing element 36 to create a seal between the first and second passages 22, 34, respectively, when an upstream volumetric flow rate of a fluid passing through the first passage 22 in a first direction (see arrow indicated at 56) is less than a first predetermined threshold. The second sealing element 40 is biased to provide a first baseline unrestricted flow of the fluid when an upstream volumetric flow rate of the fluid passing from the first delivery port 16 to the second passage 34 through the volume 46 in a second direction (see arrow indicated at 60) is less than a second predetermined threshold. A second baseline unrestricted flow of the fluid is achieved when the fluid flows from the second passage 34 to the first delivery port 16 via the volume 46 in the first direction 56 while the second sealing element 40 is in the biased position.

In the illustrated embodiment, it is contemplated that the first sealing element 36 is a soft, elastomeric material. The first sealing element 36 and the biasing member 42 act as a means for restricting flow of the fluid in the first direction 56 through the second passage 34.

In addition, it is contemplated that the second sealing element 40 is a rounded object (e.g., a sphere, a ball, etc) of a non-elastomeric material. For example, it is contemplated in one embodiment that the second sealing element 40 is a stainless steel ball. It is to be understood that other embodiments in which the second sealing element 40 is a shape other than rounded and/or a material other than stainless material are also contemplated.

As discussed above, the second sealing element 40 is positioned in the volume 46 of the housing 44 of the fluid control valve 30. A grate 62 is secured to one end of the housing 44 to secure the second sealing element 40 in the volume 46 of the housing 44.

Figure 2:
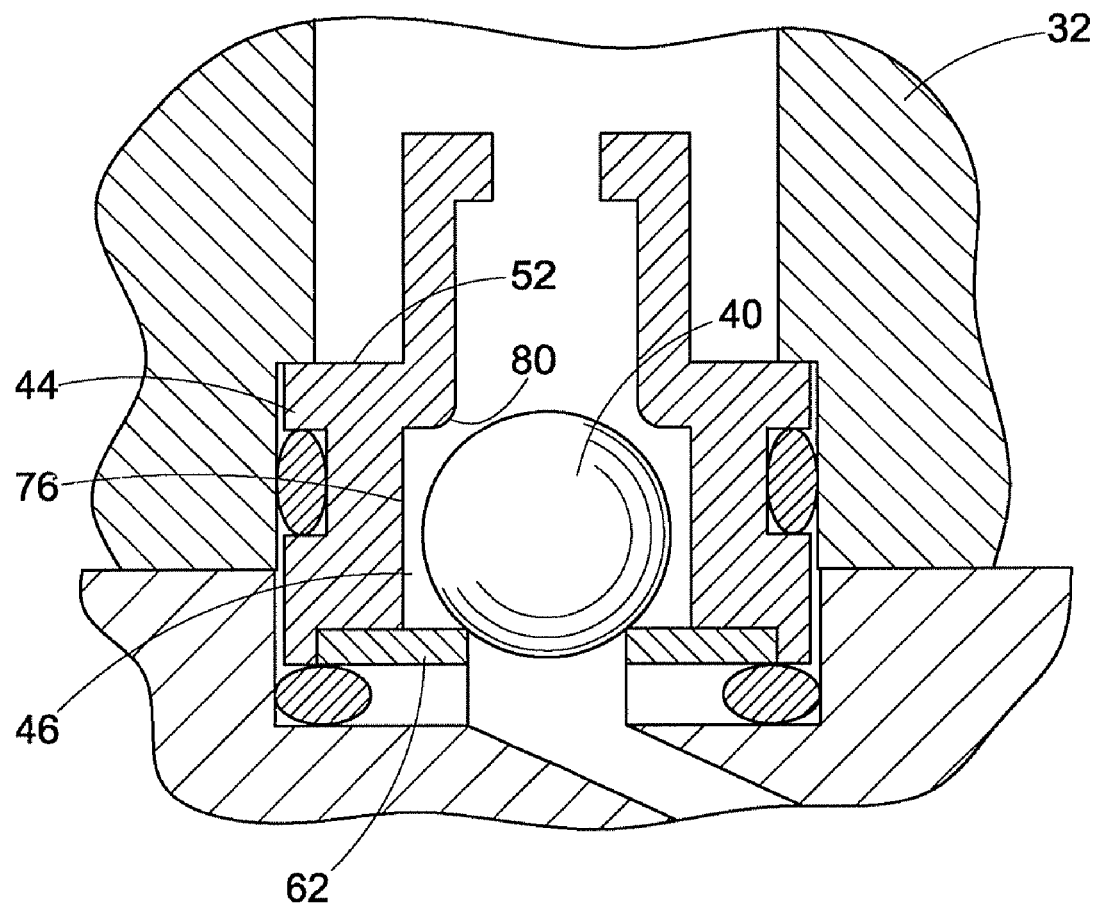
FIG. 2 illustrates an enlarged view of the second sealing element in accordance with one embodiment of an apparatus illustrating principles of the present invention.
Figure 3:
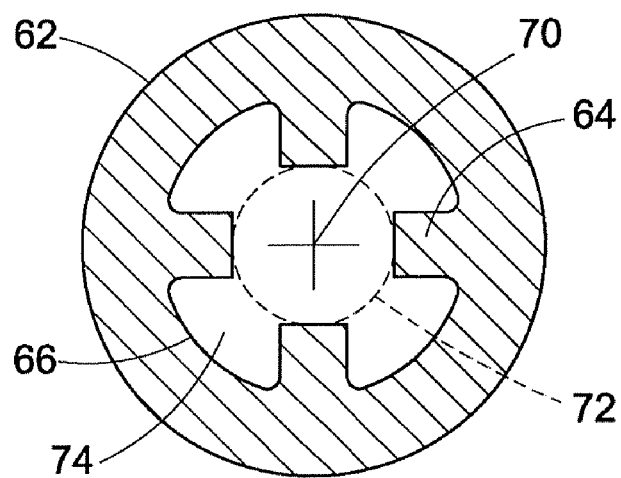
FIG. 3 illustrates an enlarged view of the grate in accordance with one embodiment of an apparatus illustrating principles of the present invention.

With reference to FIGS. 2 and 3, the grate 62 includes a plurality of arms 64 (e.g., four) partially extending from an inner radial edge 66 toward a center point shown at 70. An inner region 72 (identified by the dashed line in FIG. 3) of the grate 62 is open. The second sealing element 40 is sized to be seated on the arms 64 of the grate 62—when the second sealing element 40 is in the biased position-such that the second sealing element 40 does not pass through the grate 62. In addition, fluid flows (in both the first and second directions 56, 60, respectively (see FIG. 1)) through intermediate regions 74 between the arms 64 regardless of whether the second sealing element 40 is seated on the arms 64.

With reference to FIGS. 1-3, the grate 62 acts to cage the second sealing element 40 in the volume 46 while allowing flow of the fluid around the second sealing element 40 and through the grate 62. The second sealing element 40 freely moves within the volume 46 as a function of at least one of a tolerance between the second sealing element 40 and an inner wall 76 of the housing 44, a weight of the second sealing element 40 and/or a size (e.g., radius or diameter) of the second sealing element 40. The second sealing element 40, the volume 46, the grate 62, and the housing 44 act as a means for restricting flow of the fluid in the second direction 60 through the second passage 34.

The valve 10 is oriented so that gravity biases the second sealing element 40 to rest on the arms 64 of the grate 62 (i.e., the biased position). In this position, the first and second baseline unrestricted flows of the fluid in both the first and second directions 56, 60 through the second passage 34 are possible when the upstream volumetric flow rate of the fluid in the second direction 60 is less than the second predetermined threshold. When the upstream volumetric flow rate of the fluid in the second direction 60 becomes greater than the second predetermined threshold, the second sealing element 40 is carried by the flow of the fluid off of the arms 64 of the grate 62 and toward a seat 80 of the housing 44. The illustrated design including a sphere 40 caged, but freely moving within, the volume 46 offers robust sealing against the seat 80 under various environmental conditions. At the same time, the design eliminates the need for a spring to bias the second sealing element 40.

In one embodiment, once the second sealing element 40 is seated on the seat 80, flow of the fluid is restricted to about 10,000 standard cubic centimeters per minute (sccm) or less in the second direction 60. Therefore, the fluid is restricted from flowing from the first delivery port 16 to the supply port 12 and the second delivery port 20. However, the fluid is still free to flow approaching the first baseline unrestricted flow rate in the first direction 56 (i.e., from the supply port 12 and/or the second delivery port 20 to the first delivery port 16), which would fluidly push the second sealing element 40 back toward the biased position on the grate 62. The second sealing element 40 remains seated on the seat 80 as long as the upstream volumetric flow rate of the fluid in the second direction 60 remains greater than the second predetermined threshold.

It is contemplated that at a desired pressure and opening size to operate the valve, the first predetermined threshold is about 700 sccm. In addition, it is contemplated that the second sealing element 40 moves from the grate 62 to the seat 80 on the housing 44 when the fluid flows in the second direction 60 (i.e., from the first delivery port 16 to the supply port 12) through the second passage 34 at a rate of about 10,000 sccm. Therefore, it is contemplated that the second predetermined threshold is about 10,000 sccm. It is also contemplated that the first predetermined volumetric threshold flow may be larger than the second predetermined volumetric threshold flow. For example, if it is desired that the supply 14 acts as a primary source of fluid for larger airflow volume to the second device 26 while the first device 24 acts as a secondary source of fluid for lower airflow volume to the second device 26, the first predetermined threshold may be 15,000 sccm and the second predetermined threshold may be 10,000 sccm.

In one embodiment, it is desirable to supply fluid from the supply 14 to the first and second devices 24, 26, respectively. After the first and second devices 24, 26 are fully charged, fluid is no longer supplied from the supply 14 and the first sealing element 36 is seated in the biased position illustrated in FIG. 1 to create a seal between the supply port 12 and the second passage 34. Once the first sealing element 36 is seated, flow of the fluid less than the second predetermined threshold in the second direction 60 from the first delivery port 16 to the second passage 34 does not seat the second sealing element 40 on the seat 80. Therefore, fluid is permitted to flow from the first device 24 to the second device 26 via the second passage 34. Once the second sealing element 40 is seated on the seat 80, flow of the fluid from the first device 24 to the second device 26 is restricted to less than the second predetermined threshold (e.g., approaching 2,000 sccm or 4,000 sccm). Such a restricted flow may be desired if a leak develops in the second device 26. For example, the restricted flow of fluid would slowly provide additional fluid to the second device 26 so that the leak may be repaired and/or the supply 14 reactivated before the first device 24 is depleted of fluid.

As discussed above, the second sealing element 40 freely moves within the volume 46 as a function of a tolerance between the second sealing element 40 and the inner wall 76 of the housing 44, a weight of the second sealing element 40 and/or a size (e.g., radius or diameter) of the second sealing element 40. In one embodiment, a diameter of the second sealing element 40 is about 0.218 inches and the inside diameter of the volume 46 is about 0.260 inches, which provides a diameter clearance of about 0.042 inches between the second sealing element 40 and the inner wall 76. In this embodiment, the second predetermined threshold is about 13,700 sccm.

Figure 4:
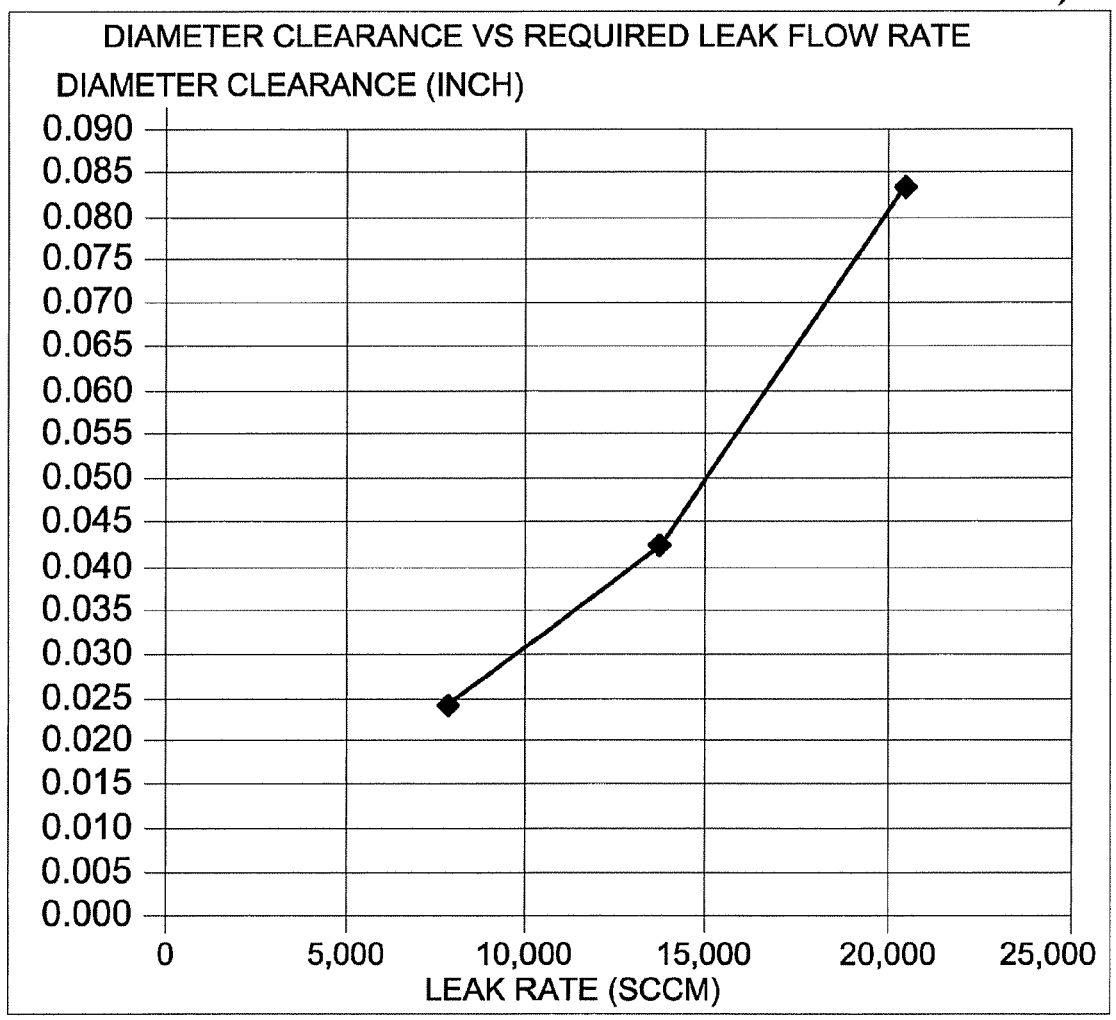
FIG. 4 illustrates a graph of delivery pressure versus leakage for the second sealing element.

With reference to FIG. 4, a graph 82 illustrating the diameter clearance (e.g., tolerance) versus a leak rate is provided. With reference to FIGS. 1 and 4, the leak rate represents a flow of the fluid from the first device 24 to the second passage 34 that will seat the second sealing element 40 on the seat 80.

Figure 5:
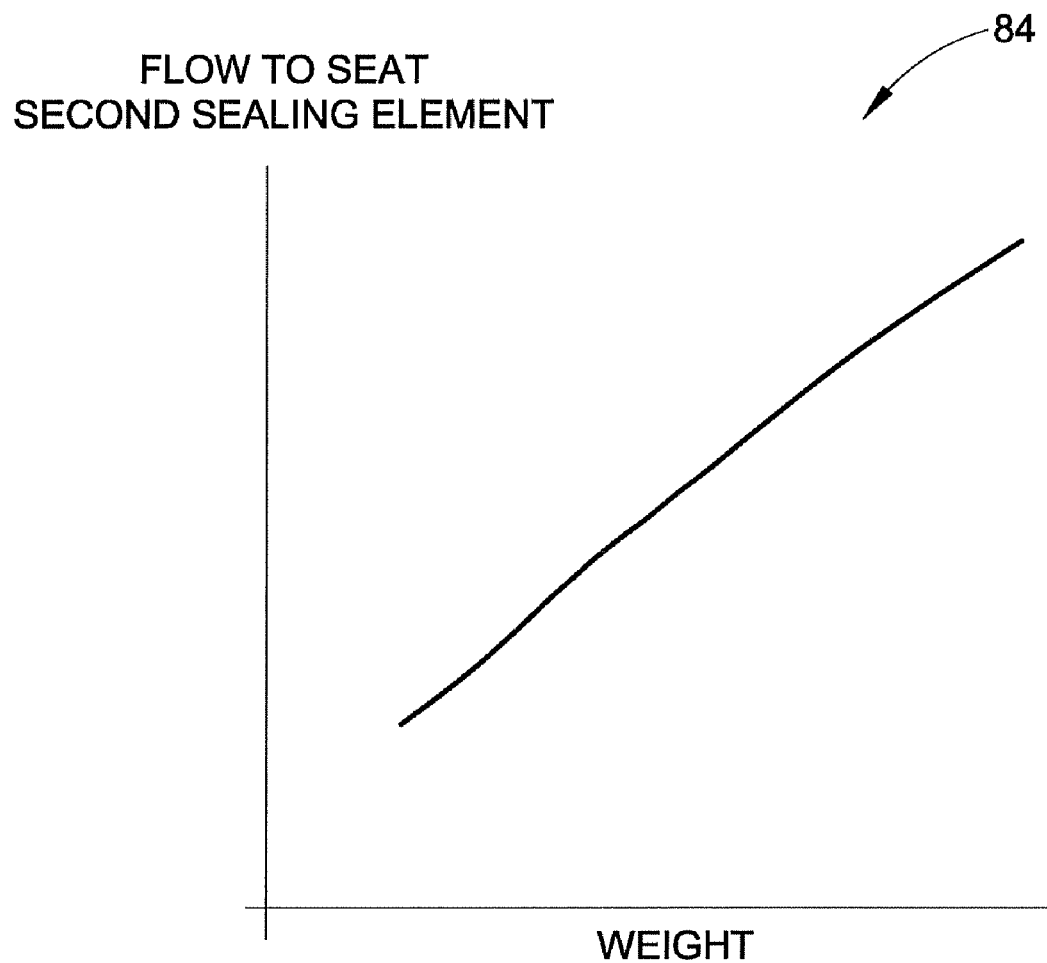
FIG. 5 illustrates a graph of a fluid flow to seat the second sealing element versus a weight of the second sealing element.

With reference to FIG. 5, a graph 84 illustrating a fluid flow to seat the second sealing element versus a weight of the second sealing element is provided. The graph 84 shows more fluid flow is required to seat a heavier second sealing element.

In one embodiment, the housing 32 is a metal material (e.g., aluminum or steel), the housing 44 is a plastic material, and the grate 62 is a metal material (e.g., stainless steel). Therefore, in the embodiment in which the second sealing element 40 is stainless steel, a steel-against-plastic seal is created between the housing 44 and the second sealing element 40.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A valve, comprising:
a passage;
a first element biased to restrict flow of a fluid in a first direction through the passage when an upstream volumetric flow rate of the fluid in the first direction is less than a first predetermined threshold; and
a second element biased to unrestrict flow of the fluid to a baseline unrestricted flow rate in a second direction through the passage when an upstream volumetric flow rate of the fluid in the second direction is less than a second predetermined threshold and the second element movable to a seat when the upstream volumetric flow rate of the fluid in the second direction is greater than the second predetermined threshold, the fluid flowing through the passage in the second direction when the second element is seated on the seat.

2. The valve as set forth in claim 1, wherein: the first element is disposed at a first end of the passage; and the second element is disposed at a second end of the passage.

3. The valve as set forth in claim 1, further including: a spring biasing the first element.

4. The valve as set forth in claim 1, wherein: the second element is a ball; and gravity biases the ball to permit flow of the fluid in the first and second directions through the passage when the upstream volumetric flow rate of the fluid in the second direction is less than the second predetermined threshold.

5. The valve as set forth in claim 4, wherein the ball is stainless steel.

6. The valve as set forth in claim 4, wherein the second predetermined threshold is a function of at least one of a weight of the ball and a diameter of the ball.

7. The valve as set forth in claim 6, further including: a housing fluidly communicating with the passage; wherein the ball is positioned in the housing; wherein the ball moves within the housing as a function of a tolerance between the ball and the housing; and wherein the second predetermined threshold is also a function of the tolerance between ball and housing.

8. The valve as set forth in claim 7, wherein the housing includes: the seat, the ball being seated against the seat and restricting flow of the fluid when the upstream volumetric flow rate of the fluid in the second direction is greater than the second predetermined threshold; and a grate, the ball being positioned between the seat and the grate, the fluid freely flowing through the grate in both the first and second directions regardless of a position of the ball; wherein the ball moves between the seat and the grate as a function of at least one of the upstream volumetric flow rate of the fluid in the second direction, the weight of the ball, the size of the ball, and the tolerance between the ball and the housing.

9. The valve as set forth in claim 8, wherein the grate cages the ball in the housing.

10. The valve as set forth in claim 1, wherein the first predetermined threshold is less than the second predetermined threshold.

11. The valve as set forth in claim 1 wherein the second predetermined threshold is 10,000 sccm.

12. The valve as set forth in claim 1 wherein when the upstream volumetric flow rate of the fluid in the second direction exceeds the second predetermined threshold, the flow rate in the second direction around the second element is restricted to about 10,000 sccm.

13. A method for controlling flow of a compressed fluid, the method comprising:
biasing a first element to restrict flow of a fluid in a first direction through a passage when an upstream volumetric flow rate of the fluid in the first direction is less than a first predetermined threshold;
biasing a second element to unrestrict flow of the fluid to a baseline unrestricted flow rate in a second direction through the passage when an upstream volumetric flow rate of the fluid in the second direction is less than a second predetermined threshold; and
positioning the second element on a seat when the upstream volumetric flow rate of the fluid in the second direction is greater than the second predetermined threshold, the fluid flowing through the passage at a restricted rate in the second direction when the second element is positioned on the seat.

14. The method for controlling flow of a compressed fluid as set forth in claim 13, wherein the step of biasing the second element includes: biasing the second element via gravity.

15. The method for controlling flow of a compressed fluid as set forth in claim 14, further including: determining the second predetermined threshold as a function of a weight of the second element.

16. The method for controlling flow of a compressed fluid as set forth in claim 13, further including: unseating the second element from the seat for unrestricting the flow of the fluid in the second direction when the upstream volumetric flow rate of the fluid in the second direction is less than the second predetermined threshold.

17. The method for controlling flow of a compressed fluid as set forth in claim 13, further including:
restricting the flow of the fluid in the second direction to about 10,000 sccm when the upstream volumetric flow rate of the fluid in the second direction is greater than the second predetermined threshold.

18. A check valve, comprising:
a passage;
a first element biased to restrict flow of a fluid in a first direction through the passage when an upstream volumetric flow rate of the fluid in the first direction is less than a first predetermined threshold;
a second element biased by gravity to unrestrict flow of the fluid to a baseline unrestricted flow rate in a second direction through the passage when an upstream volumetric flow rate of the fluid in the second direction is less than a second predetermined threshold, the second direction being substantially opposite the first direction; and
the second element moving to a seat to restrict flow of the fluid in the second direction through the passage when the upstream volumetric flow rate of the fluid in the second direction is greater than the second predetermined threshold, the fluid flowing through the passage in the second direction when the second element is seated on the seat.

19. The check valve as set forth in claim 18, wherein the second element is a ball.

20. The check valve as set forth in claim 18 wherein the second element restricts flow of the fluid in the second direction to about 10,000 sccm.

21. A valve comprising:
a first passage for receiving supply air;
a first port for delivering supply air to a first device;
a second port for delivering supply air to a second device;
a second passage in fluid communication with the first passage, the first port and the second port;
a seat located between the second passage and the first port;
a first element positioned between the first passage and the second passage, the first element permitting the flow of supply air from the first passage to the second passage when the supply air flow rate in a first direction is greater than a first predetermined threshold;
a second element positioned between the seat and the first port, the second element permitting unrestricted flow of the supply air in the first direction into the first device and the second element permitting unrestricted air flow in a second direction, opposite of the first direction, from the first device into the second passage when an air flow rate in the second direction is less than a second predetermined threshold and the second element permitting a restricted flow of air in the second direction when the air flow rate in the second direction is greater than the second predetermined threshold, and the second element is seated on the seat.

22. The valve as set forth in claim 21, wherein the second element permits a restricted flow rate from the first device to the second passage of 10,000 sccm.

* * * * *